United States Patent
Wang et al.

(10) Patent No.: US 10,233,933 B2
(45) Date of Patent: Mar. 19, 2019

(54) METHOD FOR MEASURING AIR VOLUME OF BLOWER MOTOR

(71) Applicant: Zhongshan Broad-Ocean Motor Co., Ltd., Zhongshan (CN)

(72) Inventors: Jizhong Wang, Zhongshan (CN); Yiqiao Zhou, Zhongshan (CN); Zheng Zhang, Zhongshan (CN); Yong Zhao, Zhongshan (CN); Xiansheng Zhang, Zhongshan (CN); Hairong Sun, Zhongshan (CN)

(73) Assignee: ZHONGSHAN BROAD-OCEAN MOTOR CO., LTD., Zhongshan (CN)

( * ) Notice: Subject to any disclaimer, the term of this patent is extended or adjusted under 35 U.S.C. 154(b) by 547 days.

(21) Appl. No.: 14/886,118

(22) Filed: Oct. 19, 2015

(65) Prior Publication Data

US 2016/0040679 A1  Feb. 11, 2016

Related U.S. Application Data

(63) Continuation-in-part of application No. PCT/CN2014/082814, filed on Jul. 23, 2014.

(51) Int. Cl.
*F04D 27/00* (2006.01)
*F04D 25/06* (2006.01)
*G01P 5/00* (2006.01)

(52) U.S. Cl.
CPC ........... *F04D 27/001* (2013.01); *F04D 25/06* (2013.01); *G01P 5/00* (2013.01); *F05D 2270/304* (2013.01); *F05D 2270/335* (2013.01)

(58) Field of Classification Search
CPC ......... F05D 2270/304; F05D 2270/335; F04D 27/001; F04D 17/08; F04D 25/06; F04D 25/08; G01P 5/00
See application file for complete search history.

(56) References Cited

U.S. PATENT DOCUMENTS

| | | | |
|---|---|---|---|
| 5,447,414 A | 9/1995 | Nordby et al. | |
| 6,504,338 B1 * | 1/2003 | Eichorn | G05D 7/0676 236/DIG. 9 |

(Continued)

FOREIGN PATENT DOCUMENTS

| | | |
|---|---|---|
| CN | 202013212 U | 10/2011 |
| CN | 103376743 A | 10/2013 |

(Continued)

*Primary Examiner* — Jill E Culler
*Assistant Examiner* — Leo T Hinze
(74) *Attorney, Agent, or Firm* — Matthias Scholl, PC; Matthias Scholl

(57) ABSTRACT

A method for measuring an air volume of a blower motor, including: a) establishing M constant air volume control functions $Q_i=F(n)$ corresponding to M air volume points $CFM_i$ in a microprocessor of a motor controller; b) starting the motor, measuring a real-time rotational speed $n_0$ and a parameter $Q_0$ of the motor after the motor runs in a stable state, putting the parameter $Q_0$ into the functions $Q_i=F(n)$ to obtain multiple rotational speeds $n_i$, comparing the real-time rotational speed $n_0$ with the multiple rotational speeds $n_i$ corresponding to the multiple air volume points $CFM_i$, and determining a real-time detected air volume $CFM_0$ which falls within two air volumes $CFM_i$ and $CFM_{i-1}$; and c) calculating the real-time detected air volume $CFM_0$ according to the two air volumes $CFM_i$ and $CFM_{i-1}$ and the rotational speeds $n_i$ and $n_{i-1}$ using an interpolation method.

16 Claims, 11 Drawing Sheets

(56) References Cited

U.S. PATENT DOCUMENTS 7,567,049 B2 7/2009 Shahi et al.
2015/0233380 A1* 8/2015 Sasaki .................. F04D 27/004
　　　　　　　　　　　　　　　　　　　417/44.1

FOREIGN PATENT DOCUMENTS

| CN | 104180858 A | 12/2014 |
| JP | 2013-108441 A | 6/2013 |
| WO | 2014024359 A1 | 2/2014 |
| WO | 2014024359 A1 | 7/2016 |

* cited by examiner

METHOD FOR MEASURING AIR VOLUME OF BLOWER MOTOR

CROSS-REFERENCE TO RELATED APPLICATIONS

This application is a continuation-in-part of International Patent Application No. PCT/CN2014/082814 with an international filing date of Jul. 23, 2014, designating the United States, now pending. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, Mass. 02142.

BACKGROUND OF THE INVENTION

Field of the Invention

The invention relates to a method for measuring an air volume of a blower motor.

Description of the Related Art

Typically, to monitor the air volume of an air conditioning system, an anemometer or an air volume meter is installed at the air outlet or in the ventilation duct. However, to achieve the monitoring, additional hardware and complex wiring are required. This increases the production cost.

SUMMARY OF THE INVENTION

In view of the above-described problems, it is one objective of the invention to provide a method for measuring an air volume of a blower motor. The method is adapted to accurately judge the obstruction of the air filter mesh and output the alarming signal. The method features simple mathematical model, reliable control, and high accuracy.

To achieve the above objective, in accordance with one embodiment of the invention, there is provided a method for measuring an air volume of a blower motor. The method comprises:

a) establishing M constant air volume control functions $Qi=F(n)$ corresponding to M air volume points $CFM_i$ in a microprocessor of a motor controller, where Q represents an input power, a DC bus current, or a torque, n represents a rotational speed of a motor, and i represents an integer ranging from 1 to M;

b) starting the motor, measuring a real-time rotational speed $n_0$ and a parameter $Q_0$ of the motor after the motor runs in a stable state, putting the parameter $Q_0$ into the constant air volume control functions $Qi=F(n)$ to obtain multiple rotational speeds $n_i$, comparing the real-time rotational speed $n_0$ with the multiple rotational speeds $n_i$ corresponding to the multiple air volume points $CFM_i$, and determining a real-time detected air volume $CFM_0$ which falls within two air volumes $CFM_i$ and $CFM_{i-1}$; and c) calculating the real-time detected air volume $CFM_0$ according to the two air volumes $CFM_i$ and $CFM_{i-1}$ and the rotational speeds $n_i$ and $n_{i-1}$ using an interpolation method.

In a class of this embodiment, an equation for calculating the detected air volume is $CFM_0=CFM_2+(CFM_1-CFM_2)\times(n_2-n_0)\div(n_2-n_1)$.

In a class of this embodiment, the functions $Qi=F(n)$ are established as follows: for M target air volumes, allowing the motor to operate at a constant rotational speed, regulating a static pressure from a lower boundary to an upper boundary which covers an actual static pressure range in an air duct device, and then regulating the rotational speed n and the parameter Q of the motor to keep the target air volume, and recording the rotational speed n and the corresponding parameter Q at the stable state of the motor, whereby obtaining a group of rotational speeds n and parameters Q for each of the M target air volumes, and establishing the function $Qi=F(n)$ for each target air volume by curve fitting.

In a class of this embodiment, the multiple air volume points $CFM_i$ comprise a maximum output air volume and a minimum output air volume.

In a class of this embodiment, $Qi=F(n)$ is a second order function, and each target air volume corresponds to the function $Q=C_1+C_2\times n+C_3\times n^2$.

In a class of this embodiment, the blower motor adopts brushless DC (BLDC) motor or an electronically commutated motor (ECM). The motor comprises: a motor body and a motor controller. The motor body comprises: a rotating shaft, a permanent magnet rotor assembly, a stator assembly, and a housing assembly. The permanent magnet rotor assembly and the stator assembly form magnet coupling. The stator assembly comprises: a stator core and a coil winding wound thereon. The motor controller comprises: a microprocessor, an inverter circuit, and an operation parameter detecting circuit. An output terminal of the inverter circuit is connected to the coil winding, a detected signal is input into the microprocessor by the operation parameter detecting circuit. The inverter circuit is controlled by an output terminal of the microprocessor, a preset target air volume is input into the microprocessor, and when the real-time detected air volume $CFM_0$ is smaller than the preset target air volume, an alarming signal is output.

In a class of this embodiment, the blower motor operates in a control mode of a constant air volume. When a variance between the detected air volume and the preset air volume reaches a certain value, the alarming signal is triggered. When the variance between the detected air volume and the preset air volume is within a permitted range, the alarming signal is not triggered.

In a class of this embodiment, the blower motor operates in a control mode of a constant torque. When a variance between the detected air volume and the preset air volume reaches a certain value, it is determined that an air filter mesh is blocked and the alarming signal is triggered.

In a class of this embodiment, the blower motor operates in a control mode of a constant rotational speed. When a variance between the detected air volume and the preset air volume reaches a certain value, it is determined that an air filter mesh is blocked and the alarming signal is triggered.

In a class of this embodiment, at least five air volume points are appointed.

Advantages of the method for measuring an air volume of a blower motor according to embodiments of the invention are summarized as follows:

1) M constant air volume control functions $Qi=F(n)$ corresponding to the M air volume points $CFM_i$ are established in the microprocessor of the motor controller. The real-time rotational speed $n_0$ and the parameter $Q_0$ of the motor are measured, the parameter $Q_0$ is substituted into the constant air volume control functions $Qi=F(n)$ to obtain multiple rotational speeds $n_i$. The real-time rotational speed $n_0$ is compared with the multiple rotational speeds $n_i$ corresponding to the multiple air volume points $CFM_i$, and the two air volumes $CFM_i$ and $CFM_{i-1}$ adjacent to the real-time detected air volume $CFM_0$ falls are determined. The real-time detected air volume $CFM_0$ is calculated using an interpolation method. Thus, the mathematical model is simple, the control is stable, and the accuracy is high.

2) The motor blower is utilized as the component for measuring the air volume. When the variance between the detected air volume $Q_1$ and the preset air volume $Q_0$ reaches a certain value, it is determined that the air filter mesh is blocked and the alarming signal is output. No additional hardware is required, the installation is simple, and the production cost is low.

3) The blower motor operates in the control mode of the constant air volume. The microprocessor firstly measures the actual power and judges whether the rated power is reached. When the measured actual power reaches the rated power, the variance between the detected air volume $Q_1$ and the preset air volume $Q_0$ is judged. The scheme is simple, the computation of the microprocessor is simple, and the feasibility is high.

The above function $Qi=F(n)$ is acquired as follows: for M target air volumes, allowing the motor to operate at a constant rotational speed, regulating a static pressure from a lower boundary to an upper boundary which covers an actual static pressure range in an air duct device, and then regulating the rotational speed n and the parameter Q of the motor to keep the target air volume, and recording the rotational speed n and the corresponding parameter Q at the stable state of the motor, whereby obtaining a group of rotational speeds n and parameters Q for each of the M target air volumes, and establishing the function $Qi=F(n)$ for each target air volume by curve fitting. At least five air volume points are provided, thereby effectively ensuring the accuracy of the measurement.

BRIEF DESCRIPTION OF THE DRAWINGS

The invention is described hereinbelow with reference to the accompanying drawings, in which.

DETAILED DESCRIPTION OF THE EMBODIMENTS

For further illustrating the invention, experiments detailing a method for measuring an air volume of a blower motor are described below. It should be noted that the following examples are intended to describe and not to limit the invention.

EXAMPLE 1

Figure 1:
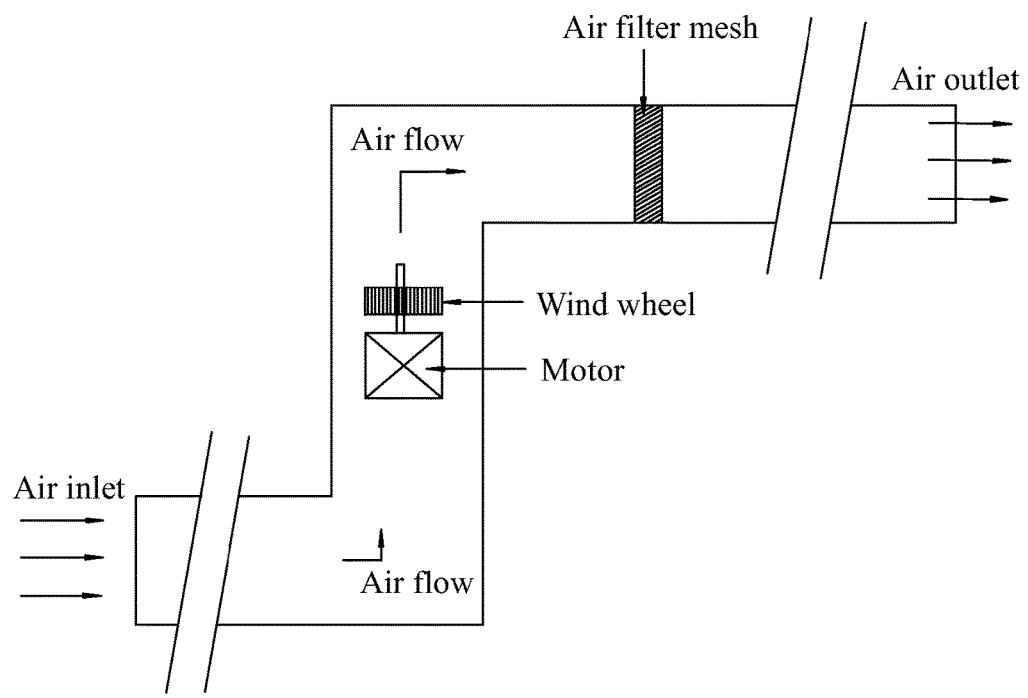
FIG. 1 is a structure diagram of an air conditioning blower system in the prior art.

Circuit structure of the blower motor and principle for measuring and controlling the air volume are introduced as follows:

As shown in FIG. 1, a blower system (e.g., a gas furnace or an air processor, which are replaced with "motor+wind wheel" in the figure) is installed in a typical air-conditioning ventilation duct. An air filter mesh is also disposed in the air duct. When the motor is started, the air is blasted. The number of air inlets and air outlets are related to the room number, no unified standards exist in the design of the air duct, and the air filter meshes may have different pressure drops, so that the actual air volume of the conventional blower system comprising a signal phase AC motor-PSC motor varies when the blower system is installed in different air ducts. The blower motor in the invention is the BLDC motor or the ECM motor.

Figure 2:
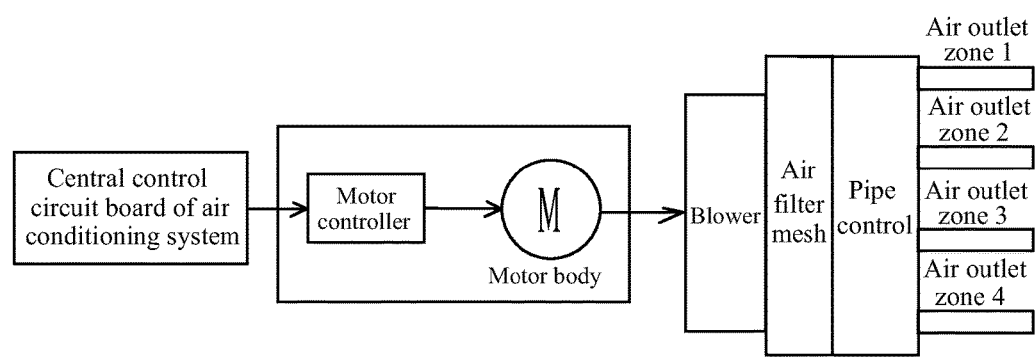
FIG. 2 is a schematic diagram showing a blower motor mounted in an air conditioning system in accordance with one embodiment of the invention.

As shown in FIG. 2, 1) the product is controlled by a controller of an air conditioning system. The controller of the air conditioning system controls all operating apparatuses of the product, sets signals via a custom-made peripheral interface circuit and a protocol, and transmits the signals to the motor controller. 2) The motor controller comprises: a microprocessor, such as an MCU or a DSP electric board, and a power supply. The power supply supplies power to each part of the circuit of the controller and is formed by setting a DC bus voltage and a DC bus current. Thus, the control of the motor requires power transportation. The motor controller produced in batches and having low production cost generally adopts a parallel resistance circuit as hardware for sensing the current and the voltage and as a feedback of the system to control the motor driver and execute the motor controller, such as a vector control, a direct torque control, or other control mode in the absence or presence of the sensor. It is well known that any variation of the running period of an electronic component is the factor affecting the measurement accuracy and the persistence. 3) A rotor of the blower motor is provided with permanent magnets, and a stator assembly is provided with multi-phase coil windings. When the temperature varies, the permanent magnets and the resistance of the coil windings changes, which possibly leads to the change of the motor control. The manufacture process of the motor also generates certain variations in the aging of the motor, the new and the old motor, the accuracy and the endurance controlled by contributing factors, and the service life, and variation of the magnetic flux of the magnets of the motor and demagnetization may occur due to the temperature variation. In addition, the malfunction of the motor shaft may occur, and the security of the system needs to be detected and monitored in real-time. 4) The blower is mounted on the shaft of the motor and air flow is produced at a certain speed during rotation. The mounting position may affect the operation, increase the friction, decrease the flow rate, or even result in the mistake rotating direction. 5) The air filter mesh must be replaced and maintained periodically, which however cannot be traced for a long turn and may increase the friction and affect the flow pressure. 6) Pipe control: the pipe system may changes the factors such as the regional control and the pressure variation of the on/off state of the ventilation ports due to the dust and the pipe rupture. Thus, multiple variable factors may be produced during the constant air volume control according to the actual circumstance.

Figure 3:
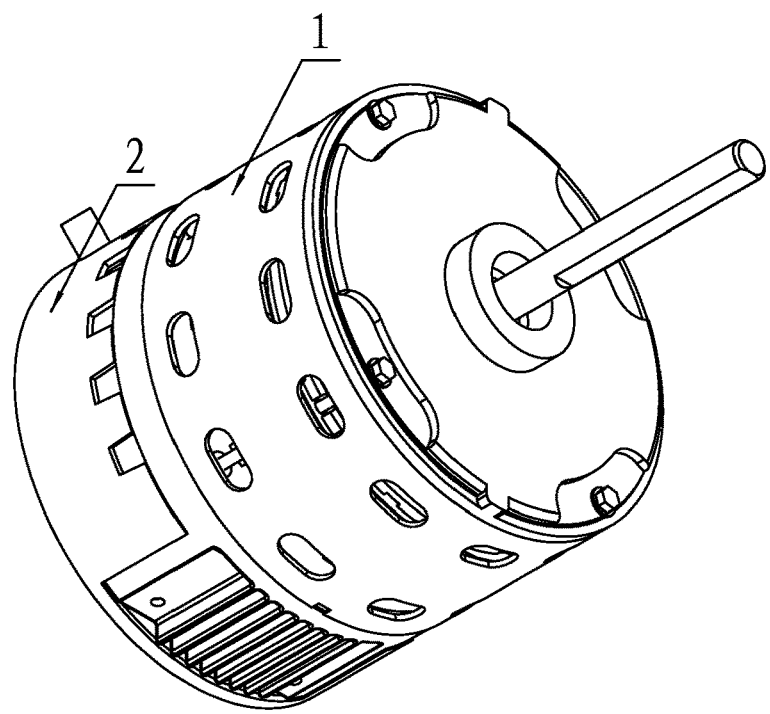
FIG. 3 is a stereogram of a blower motor in accordance with one embodiment of the invention.
Figure 4:
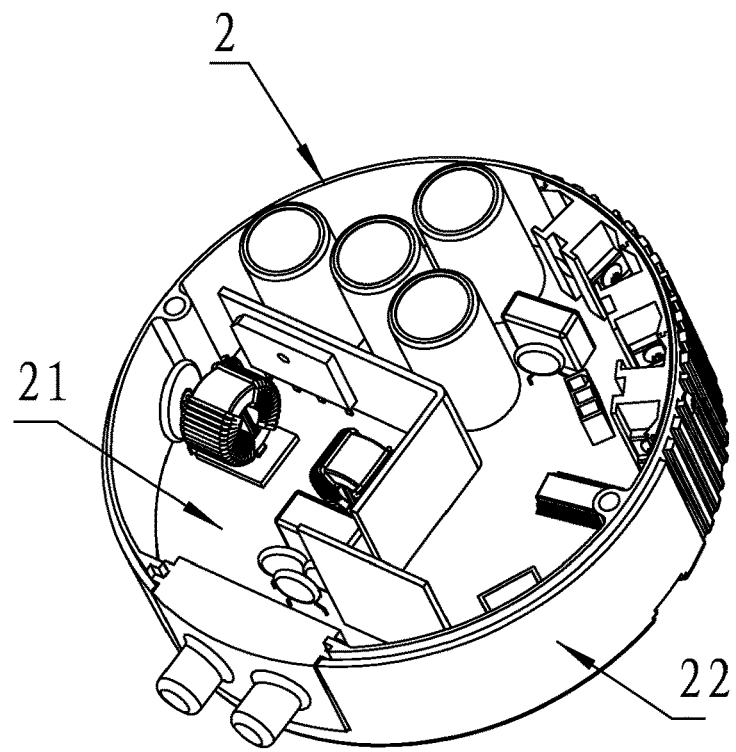
FIG. 4 is a stereogram of a motor controller for a blower motor in accordance with one embodiment of the invention.
Figure 5:
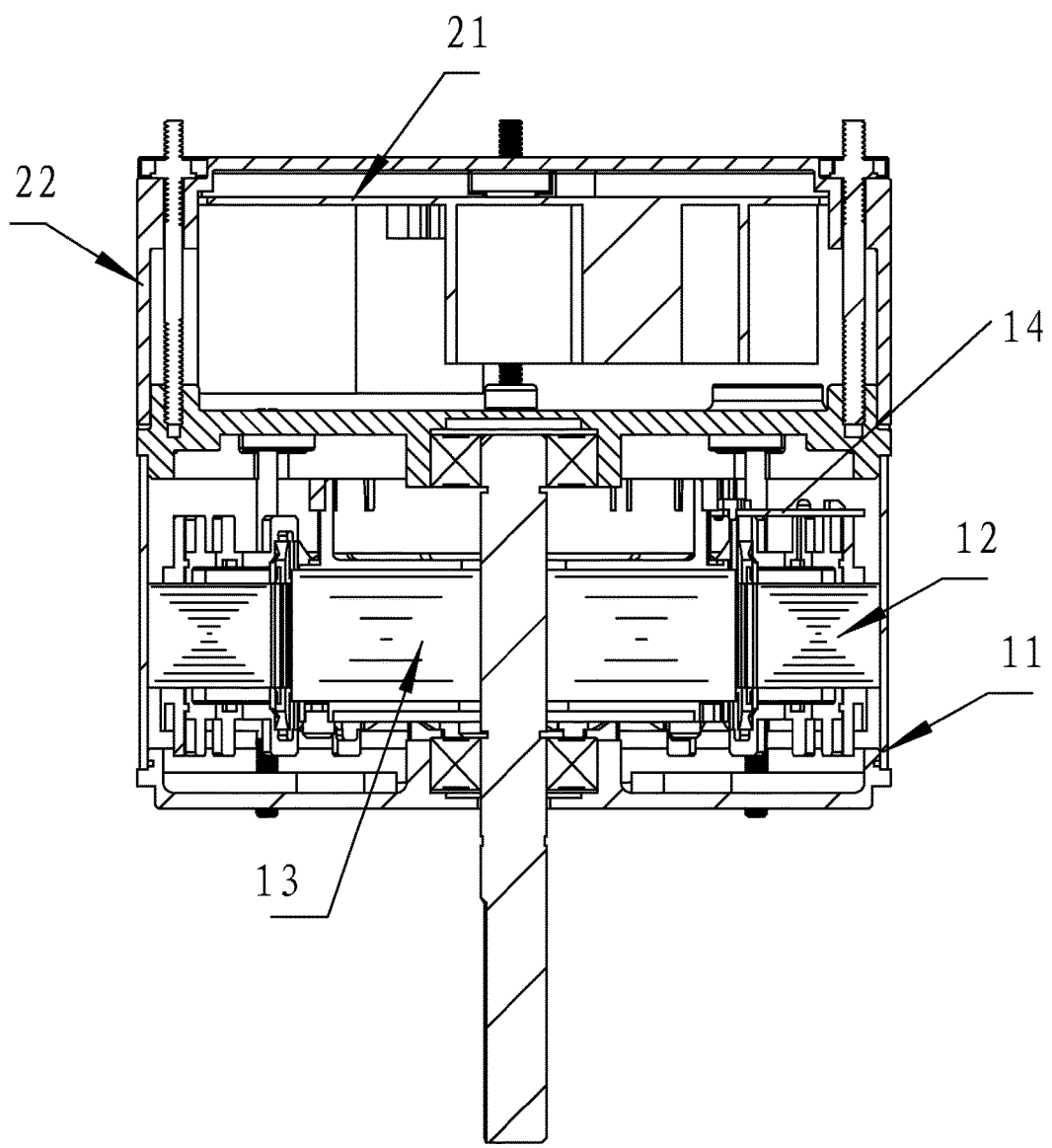
FIG. 5 is a sectional view of a motor blower in accordance with one embodiment of the invention.

As shown in FIGS. 3-5, the blower motor comprises a motor controller 1 and a motor body 1. The motor body 1 comprises: a stator assembly 12, a rotor assembly 13, and a housing assembly 11. The stator assembly is mounted on the housing assembly 11. The motor body 1 is provided with a Hall sensor 14 for detecting a rotor position. The rotor assembly 13 is nested inside or outside the stator assembly 12. The motor controller 2 comprises a control box 22 and a control circuit board 21 mounted inside the control box 22. The control circuit board 21 comprises: a power circuit, a microprocessor, a bus current detecting circuit, an inverter circuit, and a rotor position measuring circuit 14 (the Hall sensor). The power circuit supplies power for each circuit part. The rotor position measuring circuit is configured to detect a rotor position signal and input the rotor position signal to the microprocessor. The bus current detecting circuit inputs the detected bus current into the microprocessor, and the bus voltage detecting circuit inputs the DC bus voltage into the microprocessor. The microprocessor controls the inverter circuit, and the inverter circuit controls the power-on and power-off state of each phase of coil windings by controlling the stator assembly 12.

Figure 6:
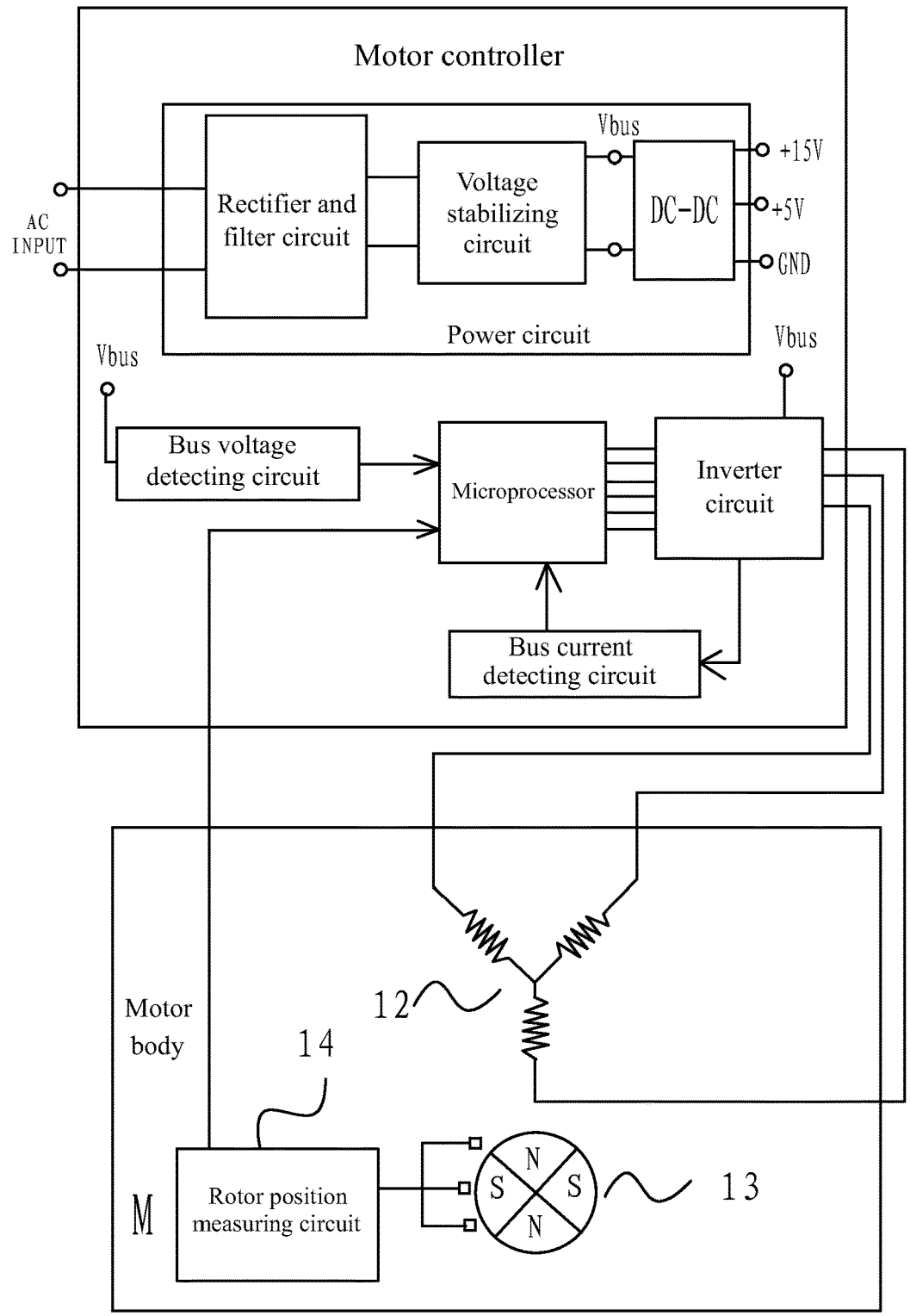
FIG. 6 is a circuit block diagram of a blower motor in accordance with one embodiment of the invention.
Figure 7:
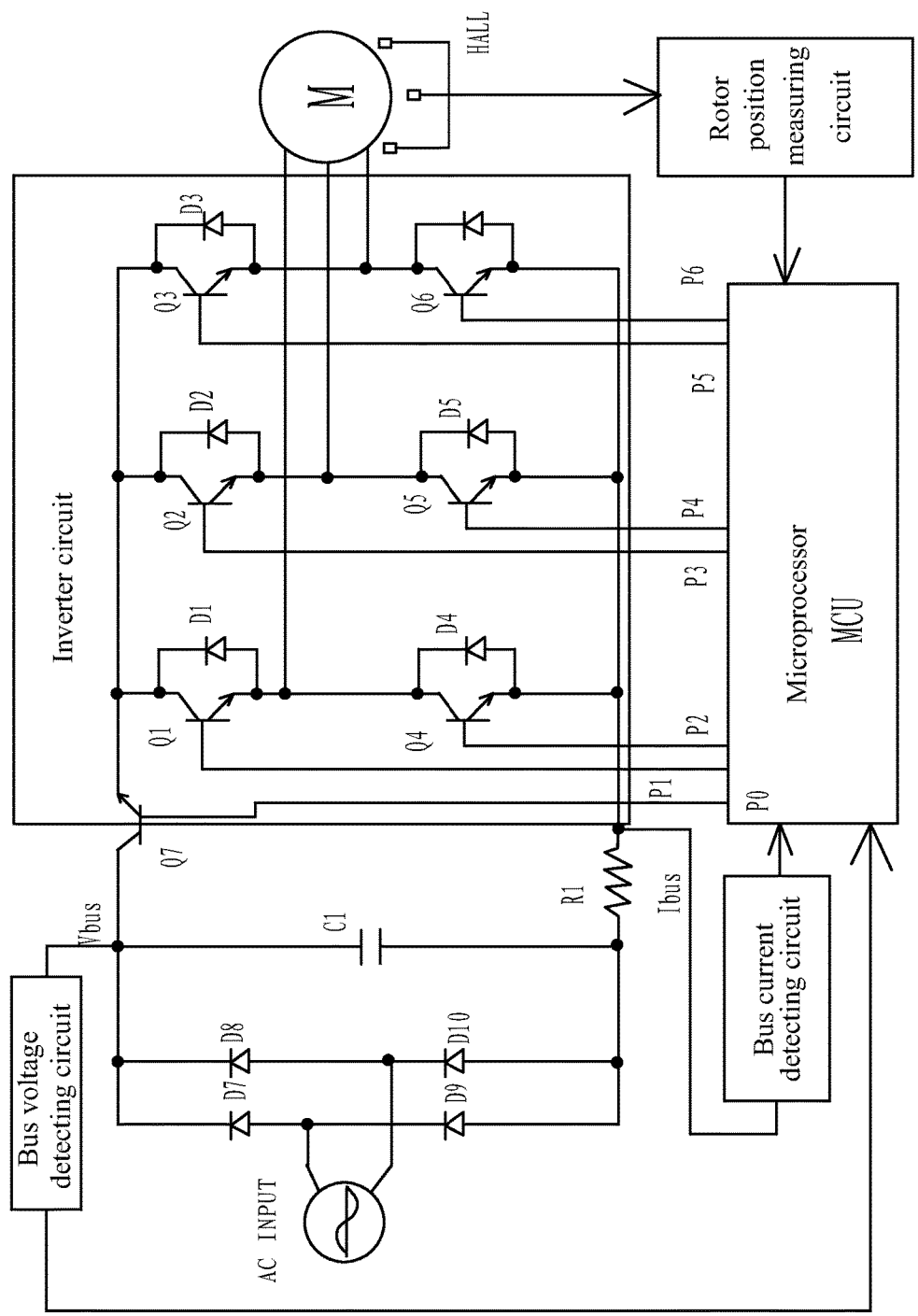
FIG. 7 is a circuit diagram corresponding to FIG. 6.

As shown in FIGS. 6-7, given that the blower motor is a three-phase brushless DC permanent synchronous motor, the rotor position measuring circuit 14 generally adopts three Hall sensors. Each of the three Hall sensors respectively detects a rotor position IN a 360° electric angle cycle, and an energization state of each phase of the coil winding of the stator assembly changes when the electric angle changes for every 120 degrees, thereby forming the three-phase six-step control mode. An AC input passes a full wave commutate circuit formed by diodes D7, D8, D9, and D10 and outputs a DC bus voltage Vbus at a terminal of a capacitance C1. The DC bus voltage Vbus is related to an input AC voltage, and when a voltage of the AC input is determined, a line voltage UP of the three-phase winding is a PWM chopped output voltage, UP=Vbus*w, in which, w represents a duty ratio of the PWM signal input into the inverter circuit by the microprocessor. The line voltage UP can be changed by changing the DC bus current Ibus. The inverter circuit is formed by electronic switching tubes Q1, Q2, Q3, Q4, Q5, and Q6, and control terminals of the electronic switching tubes Q1, Q2, Q3, Q4, Q5, and Q6 are controlled by six paths of PWM signals (P1, P2, P3, P4, P5, and P6) output by the microprocessor. The inverter circuit is further connected to a resistance R1 for detecting the bus current Ibus, and the bus current Ibus detected by the resistance R1 is converted by the bus current detecting circuit and transmitted to the microprocessor. An input power of the motor is controlled by an electronic switching tube Q7, and a conduction time of the electronic switching tube Q7 is controlled by one path of PWM signal $P_0$ output by the microprocessor so as to control the input power of the motor.

Figure 8:
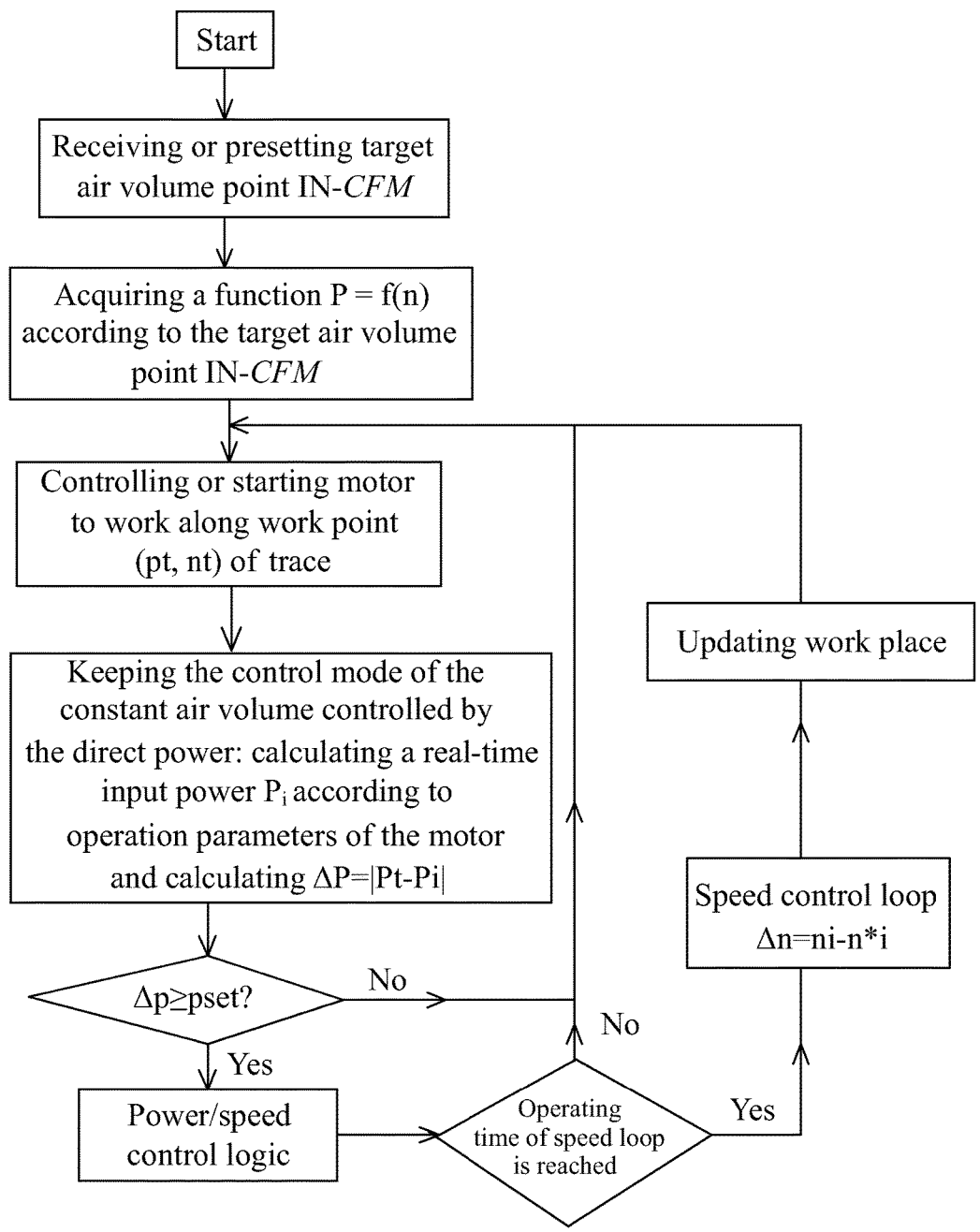
FIG. 8 is a flow chart illustrating a method for controlling a constant air volume of a blower motor in accordance with one embodiment of the invention.

As shown in FIG. 8, a method for controlling a constant air volume of a blower motor in an air conditioning system by direct power control is illustrated. The blower motor drives a wind wheel and comprises: a stator assembly, a permanent magnet rotor assembly, and a motor controller. The motor controller comprises: a microprocessor, an inverter circuit, a rotor position measuring circuit, a bus current detecting circuit, a bus voltage detecting circuit, and an input power control circuit (not shown in the figure). The signal of the rotor position is detected by the rotor position measuring circuit, and a real-time rotational speed n of the motor is calculated by the microprocessor according to the signal of the rotor position. The bus current is input into the microprocessor by the bus current detecting circuit, and the DC bus voltage is input into the microprocessor by the bus voltage detecting circuit. The inverter circuit is controlled by the microprocessor. The power-on and power-off state of each phase of the coil windings of the stator assembly is controlled by the inverter circuit, and the input power control circuit is controlled by the microprocessor. The method comprises the following steps:

A) starting the motor controller, receiving or presetting an target air volume point IN-CFM;

B) acquiring a function P=f(n) according to the target air volume point IN-CFM, in which, n represents the rotational speed, and P represents the input power of the motor.

C) entering the control mode of the constant air volume controlled by the direct power: starting the motor when the rotational speed of the motor is zero, allowing the motor to reach a stable work point ($p_t$, $n_t$) along a control trace of the function P=f(n), in which $p_t, n_t$ is a pair of input power and rotational speed satisfying the trace of the function P=f(n) involving the constant air volume control;

D) keeping the control mode of the constant air volume controlled by the direct power: calculating a real-time input power $P_i$ according to operation parameters of the motor and calculating $\Delta P=|Pt-Pi|$;

E) keeping the current work point when a power increase $\Delta P$ is smaller than a preset value $P_{set}$;

F) when the power increase $\Delta P$ is larger than the preset value $P_{set}$, determining by calculation of power/rotational speed control logic whether an operating time of a speed loop is reached; and when the operating time of the speed loop is not reached, keeping the current work point;

G) when the operating time of the speed loop is already reached, entering a speed control loop and regulating the speed according to $\Delta n=|ni-nt|$, in which, i represents a real-time rotational speed, reaching a new work point ($P_i$, $n_i$), that is, $P_t=P_i$, and $n_t=n_i$, and return C).

The function Pi=F(n) is acquired as follows: for multiple target air volumes, allowing the motor to operate at a constant rotational speed, regulating a static pressure from a lower boundary to an upper boundary which covers an actual static pressure range in an air duct device, and then regulating the rotational speed n and a real-time input power $P_i$ of the motor to keep the target air volume, and recording the rotational speed n at the stable state of the motor and the corresponding real-time input power $P_i$, whereby obtaining a group of the rotational speed n and the real-time input power $P_i$ for each of the M target air volumes, and establishing the function $Q_i=F(n)$ for each target air volume by curve fitting.

When the target air volume point IN-CFM input from the external is not equal to any of the multiple target air volume, a function of $P=f(n)$ corresponding to any of the target air volume points IN-CFM input from the external is calculated by fitting via interpolation method, thereby realizing the constant air volume control for any target air volume in the entire process.

The function $P=f(n)$ is a polynomial function, $P=C_1+C_2 \times n+ \ldots +C_m \times n^{m-1}$, in which $C_1, C_2 \ldots, C_m$ represent coefficients, n represents the rotational speed of the motor. Each target air volume corresponds to a group of coefficients $C_1, C_2 \ldots, C_m$ and the corresponding relations are stored. A corresponding group of the coefficients $C_1, C_2 \ldots, C_m$ are acquired by the microprocessor according to the input target air volume points IN-CFM by a look-up table method and the interpolation method.

The function $P=f(n)$ is a second order function $P=C_1+C_2 \times n+C_3 \times n^2$.

Figure 9:
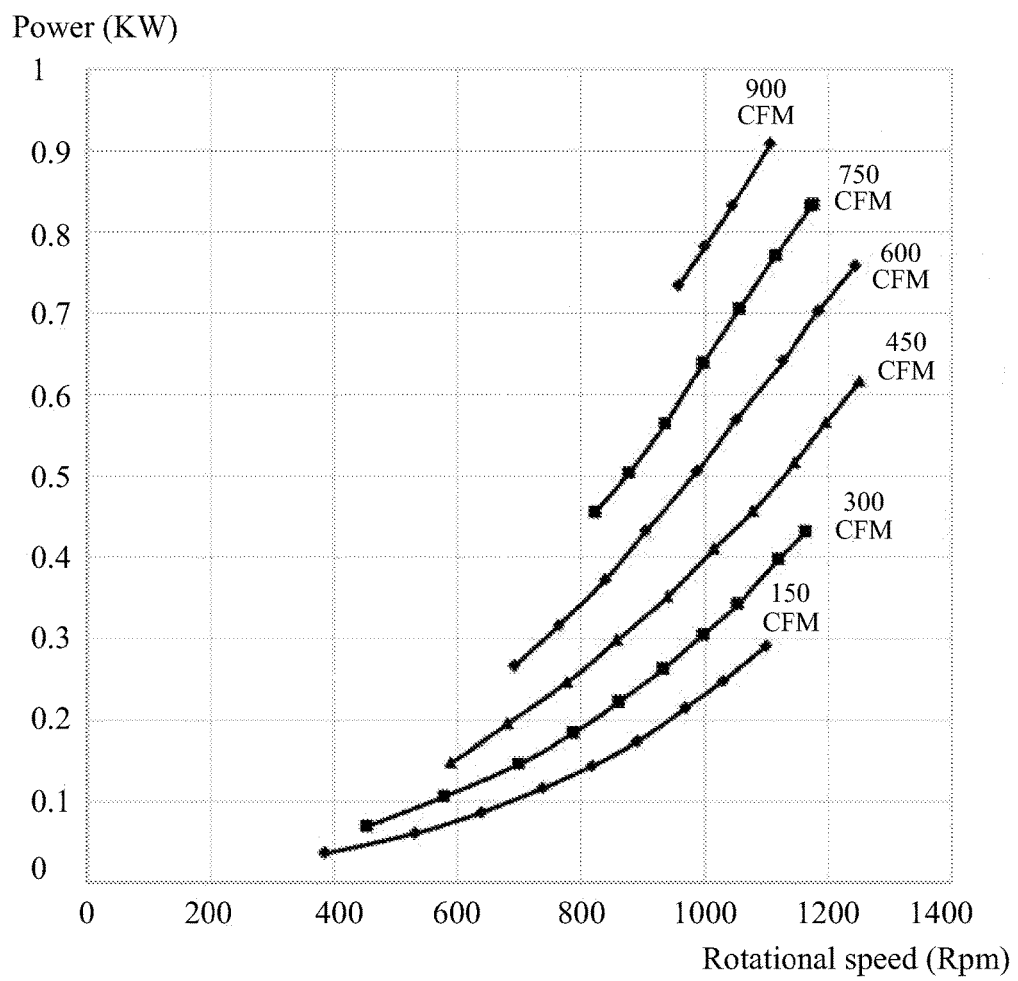
FIG. 9 is fitting curves of constant air volumes of a blower motor acquired from measurement in accordance with one embodiment of the invention.

The mathematical model of the method for controlling the constant air volume by the direct power control of the invention is developed and established as follows: generally speaking, in the air ventilation system, the blower is driven by the blower motor to produce the air flow in a stable state. The constant air volume control is realized by the control of the speed and the power at a static pressure, which satisfies the relation CFM=F (P, speed, pressure), where CFM represents the air volume, P represents the power, speed represents the speed, and pressure represents the static pressure. When the static pressure changes, the constant air volume is maintained by controlling the power and the speed. The power and the speed change with the increase of the static pressure, which is illustrated by the CFM curves of the constant air volume in FIG. 9. Based on the CFM curves, the control model is developed. When the air volume requirement is determined by the product control, the constant air volume CFM is realized by controlling the power and the speed at a certain static pressure. As shown in FIG. 9, the characteristic curve represents the physical property of the constant air volume controlled by the power and the rotational speed. For any designed air flow system in a range of a rated power of the motor based on the test results of the power and the rotational speed curve, a typical second-order function $P=C_1+C_2 \times n+C_3 \times n^2$ can be used as a typical function for development and modeling. Three undetermined points (A, B, and C) are selected from the curve, corresponding coordinates of these points are (p1,n1), (p2,n2), and (p3,n3), and coefficients thereof are C1, C2, and C3, which satisfy the following equation:

$$F(A,B,C)=\Sigma_i^m(Yi-(C1+C2*n+C3*n^2))^2,$$

the equation is solved by $\partial F/\partial A=0$, $\partial F/\partial B=0$, and $\partial F/\partial C=0$, so that m=3.

The curve fitting process is selecting the polynomial curve for description. The coefficient of the polynomial can be calculated by the least square method. Theoretically, $P=C_1+C_2 \times n+C_3 \times n^2+ \ldots +Cm \times n^{m-1}$ is adopted for calculation, but in practice the binomial is adapted to satisfy the general requirement. The function relation $P=f(n)$ is a second-order function, $P=C_1+C_2 \times n+C_3 \times n^2$, in which $C_1$, $C_2$, and $C_3$ are coefficients, and n is the rotational speed of the motor. In multiple measured target air volume, each target air volume corresponds to a group of coefficients $C_1$, $C_2$, and $C_3$, and the corresponding relation is stored, so that the corresponding group of the coefficients $C_1$, $C_2$, and $C_3$ is acquired by the microprocessor using the look-up table method according to the input target air volume IN-CFM, thereby obtaining the function relation $P=f(n)$. Each target air volume of a certain load and the corresponding coefficient group thereof $C_1$, $C_2$, and $C_3$ are listed in Table 1.

TABLE 1

| CFM | $C_1$ | $C_2$ | $C_3$ |
|---|---|---|---|
| 150 | 0.338 | −0.151 | 0.0458 |
| 300 | 0.4423 | −0.2113 | 0.0765 |
| 450 | ... | ... | ... |
| 600 | ... | ... | ... |
| 750 | ... | ... | ... |
| 900 | ... | ... | ... |

Figure 10:
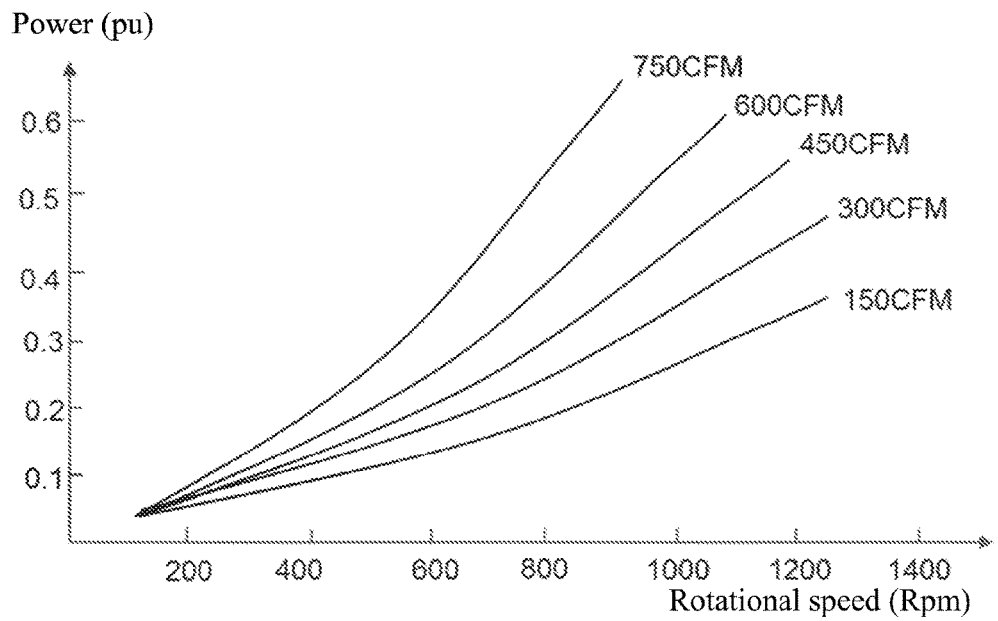
FIG. 10 is fitting curves of experimental data of constant air volumes by direct power control of a ⅓ HP blower motor.

FIG. 10 is fitting curves of experimental data of the constant air volume controlled by the direct power of a ⅓ HP blower motor in a small pipe of the air conditioning system. For a given objective air flow, some typical air volume points CFM are selected by the system as test points to establish a data bank for the mathematical model. The typical air volume points include a minimum air volume and a maximum air volume, and additional middle points are selected according to the product specification. Five typical test points of the air volume CFM are provided, which are 150, 300, 450, 600, and 750 CFM.

An example is illustrated in Table 2 to show the results of the test data. The rotational speed of the motor ranges from 200 to 1400 rpm. The static pressure of the system is between 0.1 and 1 $H_2O$. The output of the preset constant air volume CCFM is maintained so as to acquire a per-unit value of the input power of the motor corresponding to FIG. 10 and to form the data bank.

TABLE 2

| 150 CFM air volume | | 300 CFM air volume | | 450 CFM air volume | | 600 CFM air volume | | 750 CFM air volume | |
|---|---|---|---|---|---|---|---|---|---|
| Rotational speed | Power | Rotational speed | Power | Rotational speed | Power | Rotational speed | Power | Rotational speed | Power |
| 385.3 | 3.6% | 452.2 | 6.9% | 590.1 | 14.8% | 693.6 | 26.6% | 822.9 | 45.6% |
| 385.9 | 3.6% | 577.7 | 10.6% | 680.6 | 19.6% | 763.9 | 31.6% | 878.1 | 50.4% |
| 531 | 6.0% | 700.3 | 14.6% | 778.5 | 24.7% | 839.3 | 37.2% | 936 | 56.4% |
| 637.3 | 8.6% | 787.5 | 18.4% | 858.4 | 29.8% | 905 | 43.2% | 997.9 | 63.9% |
| 737.4 | 11.6% | 861.2 | 22.2% | 940.5 | 35.2% | 987.8 | 50.6% | 1056 | 70.5% |
| 818.4 | 14.4% | 932.6 | 26.2% | 1015 | 41.0% | 1051 | 57.0% | 1115 | 77.1% |
| 891 | 17.4% | 997.9 | 30.5% | 1078 | 45.6% | 1127 | 64.1% | 1176 | 83.3% |
| 970.3 | 21.5% | 1053 | 34.2% | 1146 | 51.6% | 1184 | 70.2% | 1173 | 83.2% |
| 1029 | 24.8% | 1119 | 39.7% | 1197 | 56.6% | 1245 | 75.0% | | |

TABLE 2-continued

| 150 CFM air volume | | 300 CFM air volume | | 450 CFM air volume | | 600 CFM air volume | | 750 CFM air volume | |
|---|---|---|---|---|---|---|---|---|---|
| Rotational speed | Power | Rotational speed | Power | Rotational speed | Power | Rotational speed | Power | Rotational speed | Power |
| 1100 | 28.3% | 1165 | 43.1% | 1252 | 61.6% | | | | |
| 1163 | 32.4% | | | | | | | | |

The least square method, the second order function relation between each preset air volume CFM and the corresponding power and rotational speed, is adopted to calculate the power defined by the equation and the rotational speed of the work point of any system under a given static pressure. When the preset air volume IN-CFM is input, a corresponding function is defined by the motor system, and the trace of the work point satisfies the definition of the function. The equations (3)-(7) can be presented by a standard equation, and C1, C2, and C3 are constants.

$$\text{Power}(150) = 0.3388\left(\frac{n}{1000}\right)^2 - 0.1551\left(\frac{n}{1000}\right) + 0.0458 \quad (3)$$

$$\text{Power}(300) = 0.4423\left(\frac{n}{1000}\right)^2 - 0.2113\left(\frac{n}{1000}\right) + 0.0765 \quad (4)$$

$$\text{Power}(450) = 0.3987\left(\frac{n}{1000}\right)^2 - 0.0308\left(\frac{n}{1000}\right) + 0.0294 \quad (5)$$

$$\text{Power}(600) = 0.2580\left(\frac{n}{1000}\right)^2 + 0.3983\left(\frac{n}{1000}\right) - 0.1379 \quad (6)$$

$$\text{Power}(750) = 0.1385\left(\frac{n}{1000}\right)^2 + 0.8150\left(\frac{n}{1000}\right) - 0.3139 \quad (7)$$

Thus, $P = C_1 + C_2 \times n + C_3 \times n^2$ is obtained. The established curves of the equations (3)-(7) provide five traces for the selected work points required by the five constant air volumes CFM.

Figure 11:
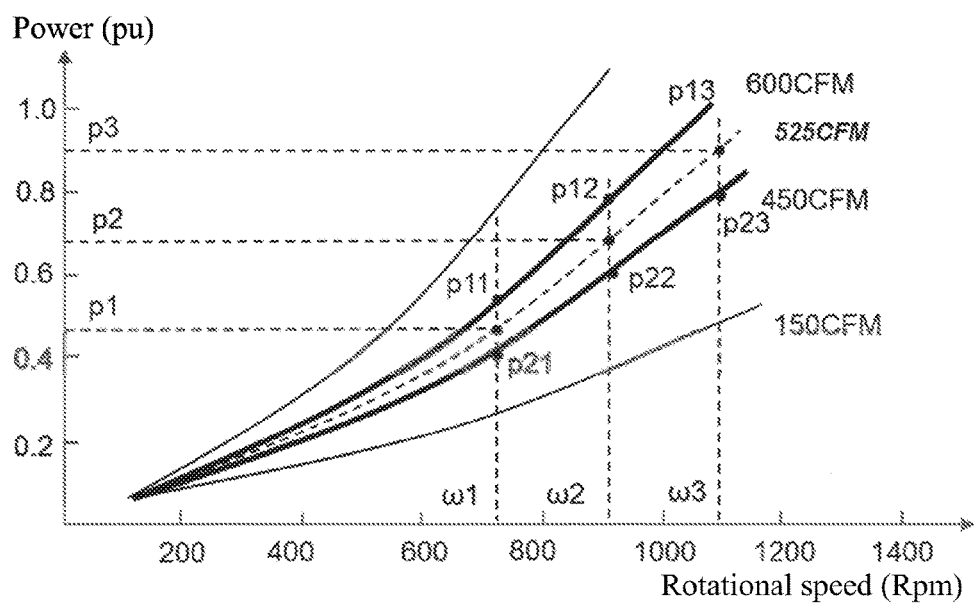
FIG. 11 is fitting curves of experimental data for calculating any input air volume of a blower motor using an interpolation method.

As shown in FIG. 11, if the requested constant air volume IN-CFM is not any of the modeled curves, the interpolation method is used to acquire a new characteristic equation to fit the requested constant air volume IN-CFM. For example, when the requirement for the requested constant air volume IN-CFM=525 cfm is received, the adjacent two curves CFM1-600 cfm and CFM2-450 cfm are recognized by the model, and the new equation of the curve IN-CFM=525 cfm is calculated by the two corresponding equations. Based on the requested IN-CFM=525 cfm and the three selected rotational speed ω1, ω2, and ω3, the power values at these rotational speeds are calculated. The functions corresponding to the two model curves are utilized to calculate the P value for selected speed of the double power points by the linear weighted interpolation. Firstly, matrix data are listed as follows:

$$\begin{bmatrix} P_i \\ P_1^{(600)} \\ P_2^{(450)} \end{bmatrix} = \begin{bmatrix} \omega_1 & \omega_2 & \omega_3 \\ P_{11} & P_{12} & P_{13} \\ P_{21} & P_{22} & P_{23} \end{bmatrix}$$

One power point $(p_{1i}, p_{2i})$ corresponds to a selected speed ω, and the selected speed ω1, ω2, and ω3 correspond to three groups of power points $(p_{1i}, p_{2i})$, and the linear weighted interpolation value can be used to calculate the $P_i$ according to the equation $pi = p_{2i} + w \cdot (p_{1i} - p_{2i})$. The weighted value W is calculated as follows:

$$w = \frac{CFM - CFM2}{CFM1 - CFM2}.$$

It should be noted that CFM2<IN-CFM≤CFM1, and 0≤W≤1. The following matrix equation is calculated as follows:

$$\begin{bmatrix} \omega_1^2 & \omega_1 & 1 \\ \omega_2^2 & \omega_2 & 1 \\ \omega_3^2 & \omega_3 & 1 \end{bmatrix} \begin{bmatrix} C_1 \\ C_2 \\ C_3 \end{bmatrix} = \begin{bmatrix} P_1 \\ P_2 \\ P_3 \end{bmatrix}$$

Thus, the function $P = C_1 + C_2 \times n + C_3 \times n^2$ corresponding to IN-CFM=525 cfm can be acquired. Coefficients C1, C2, and C3 can be calculated by solving the matrix equation. Thus, the power equation can be acquired for any request input air volume IN-CFM. Since such process is accomplished in the microprocessor-MCU in the motor controller, the power calculation does not consume much real-time CPU resource.

It is known that the direct power control adopts the rotational speed control to reach the power control. The control logic of the power/rotational speed functions in coordinating the time constant of the power/rotational speed circuit to ensure the stability of the system. The control can be realized by the accuracy control of the motor and the comparison of the torque control. The speed control is much effective than the torque control under either the vector control or the scalar control, thereby improving the control accuracy.

Figure 13:
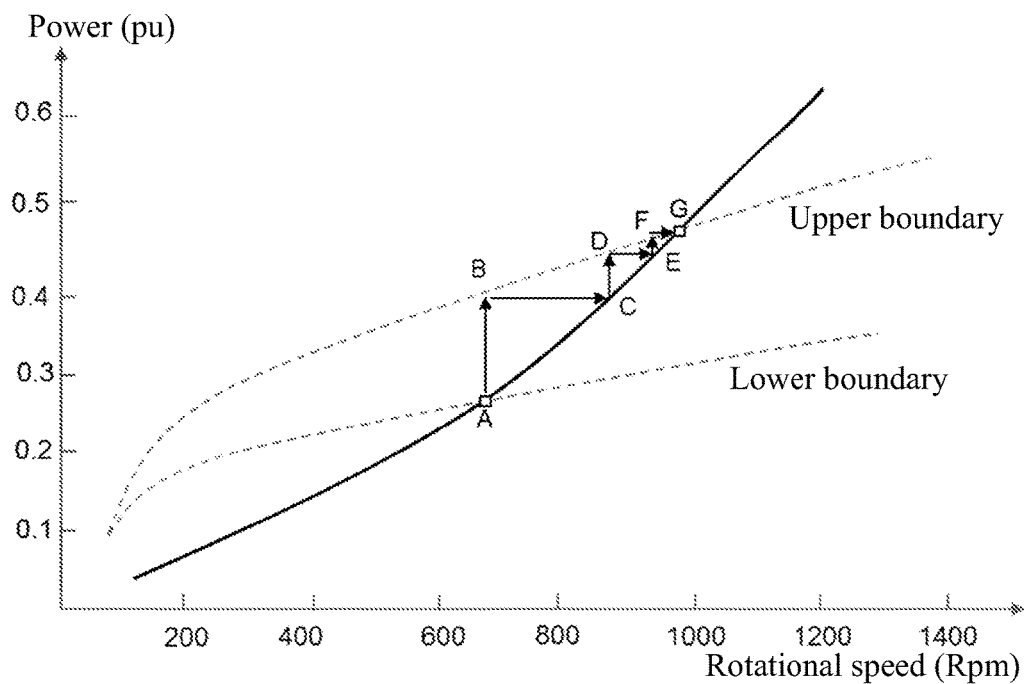
FIG. 13 is a diagram showing a first control process of a method for controlling a constant air volume of a blower motor in accordance with one embodiment of the invention.

The DPC control realizes the speed control by the unique power feature and the speed feature of the blower load. The rotational speed increases from zero to a certain value, while the power correspondingly increases from zero. The rotational speed of the motor increases to a certain work point A (power, speed), which is a static pressure point, as shown in FIG. 13. When the static pressure suddenly increases under the speed control mode, the motor provides a higher power (or a larger toque) to keep the speed because the relatively higher static pressure requires a great power. The power will increase to a much higher degree, and when the motor system reaches a new work point B at the same rotational speed, whether the work point B is on the constant CFM trace is known by the algorithm, thereby determining a pair of power/speed point C. However, the point C is not a stable work point. To satisfy the requirement of the high power, a D point is reached, the above steps are repeated until a new stable work point G is reached by equiconvergence, and the process is finished.

Figure 14:
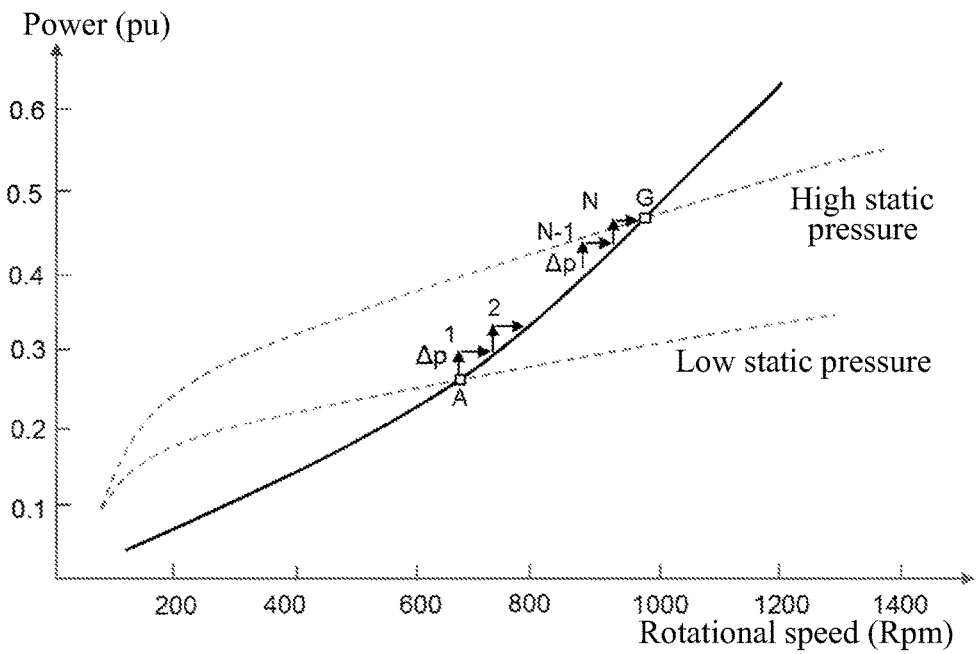
FIG. 14 is a diagram showing a second control process of a method for controlling a constant air volume of a blower motor in accordance with one embodiment of the invention.

In the example, the restricted control of the power increase is adopted in case of sudden variation of the power fluctuation. As shown in FIG. 14, the power increase can be defined as ΔP. As long as the power variation exceeds the power increase ΔP, the speed control is executed. In such mode, all the work points work under a positive and negative bandwidth of a corresponding CFM trace of the constant air volume. The air flow control system is stable during the transitional process of the static pressure variation.

Figure 15:
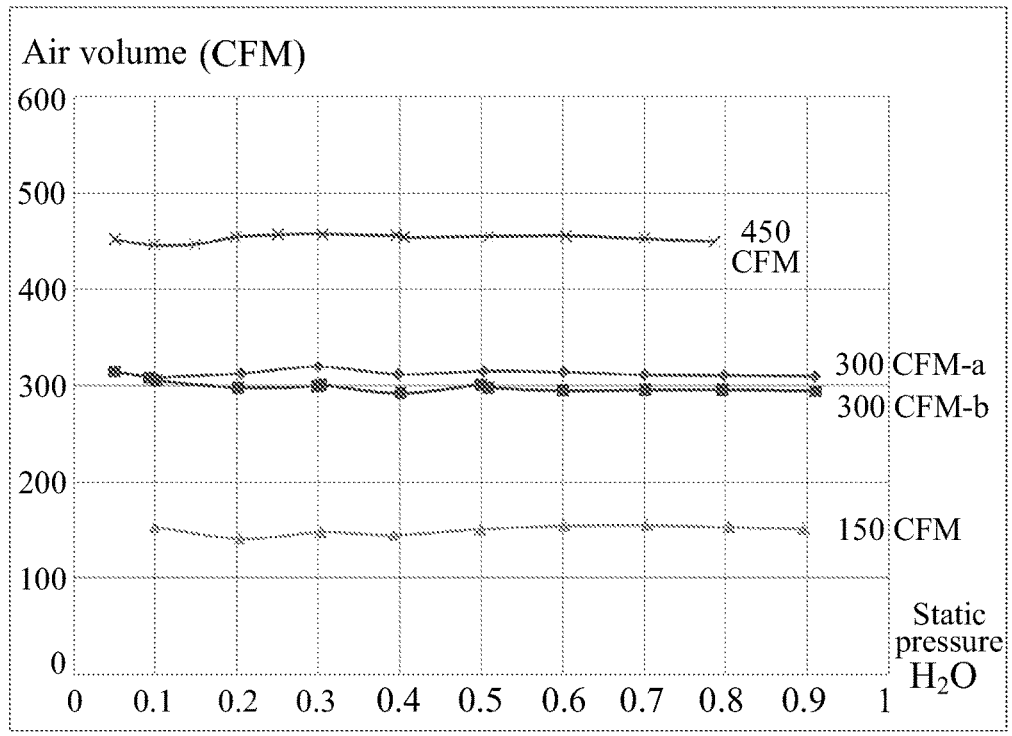
FIG. 15 is a diagram showing test results of a method for controlling a constant air volume of a blower motor demonstrated by experiments in accordance with one embodiment of the invention.

As shown in FIG. 15, the above method and the algorithm for controlling the constant air volume by the direct power control have been tested on the blower motor controller, and all the performances of the system satisfy the requirements of FIG. 15.

Figure 12:
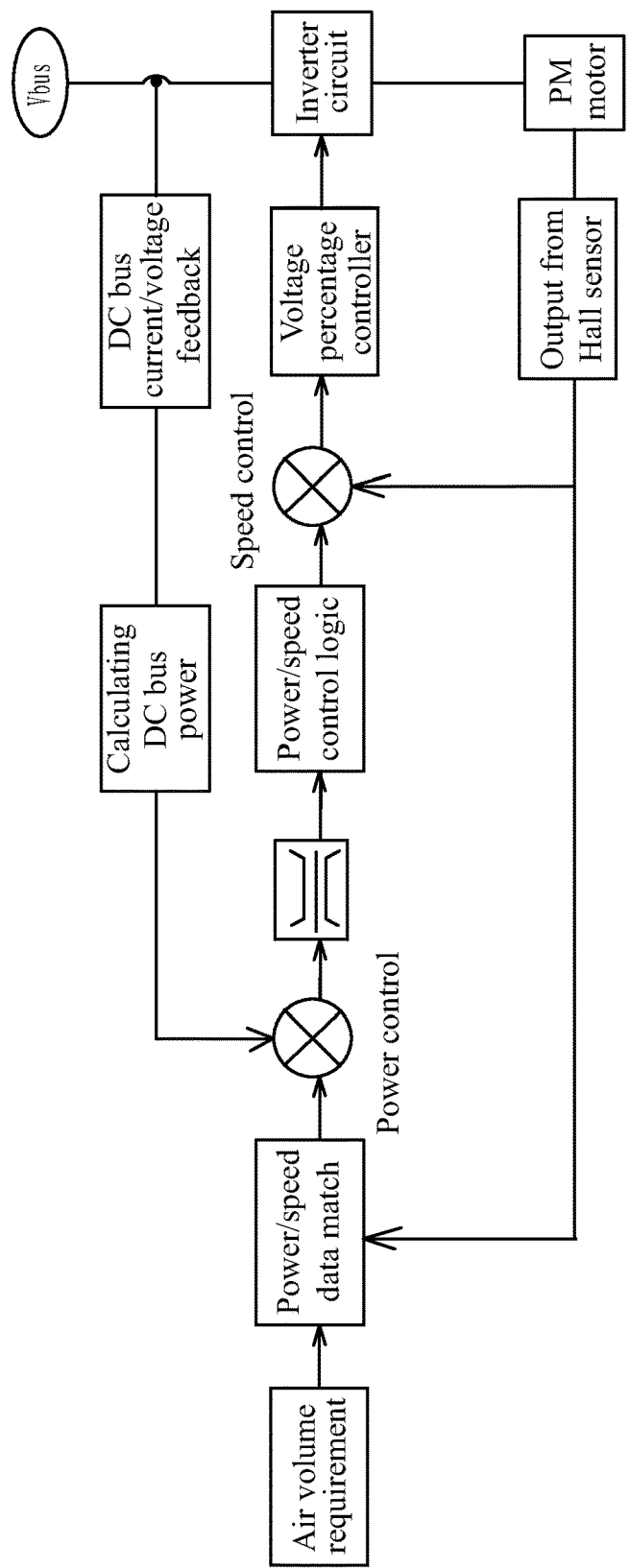
FIG. 12 is a control logic diagram of a method for controlling a constant air volume of a blower motor in accordance with one embodiment of the invention.

FIG. 12 is a logic block diagram showing the application of the scalar control of the blower motor. The input power is acquired under the DC bus voltage and current. The power and the rotational speed are limited within the maximum power $P_{max}$ and the maximum rotational speed $n_{max}$.

The real-time input power value $P_i$ of the motor is calculated by the feedback DC bus current/voltage, and based on the match of the target air volume IN-CFM input from the external and the power/speed data, the calculated value $P_t$ of the input power of the motor is acquired. The calculated value $P_t$ of the input power of the motor is then compared with the real-time output power $P_i$ of the motor to acquire a power difference ΔP which is limited within a certain range thereby being prevented from being too large and avoiding the relatively large fluctuation of the power. The power difference ΔP is output by the power/speed control logic for conducting the speed loop control, and the rotational speed control is carried out by the PWM frequency inverter. The scalar control is adopted, that is, the real-time input power $P=I_{bus} \times V_{bus}$ is calculated based on the collected real-time bus current $I_{bus}$ and real-time bus voltage.

Principle for measuring the air volume of the blower motor is as follows:

Based on the above theoretical analysis: FIG. 10 is a chart showing the fitting curves of the experimental data of the constant air volume by the direct power control of a ⅓HP blower motor in an air conditioning system provided with a small pipe, five test points of the air volume CFM are provided, which are respectively 150, 300, 450, 600, and 750 CFM, and equations (3)-(7) are acquired. Table 2 is an example showing the test data results. The rotational speed of the motor is in a range of between 200 and 1400 rpm. The static pressure of the system ranges from 0.1 to 1 H$_2$O, the output of the preset air volume CCFM is maintained, and the per-unit value of the input power of the motor corresponding to FIG. 10 is acquired. Air volume data input that does not belong any of the above 5 work points are described, for example, the function $P=C_1+C_2 \times n+C_3 \times n^2$ of IN-CFM=525 cfm is acquired. The coefficients $C_1$, $C_2$, and $C_3$ can be calculated when the matrix equation is solved. Thus, for any requested input air volume IN-CFM, the power equation can be acquired, that is, for any input target air volume, the function $P=C_1+C_2 \times n+C_3 \times n^2$ for the constant air volume control corresponding to the target air volume can be acquired.

Figure 16:
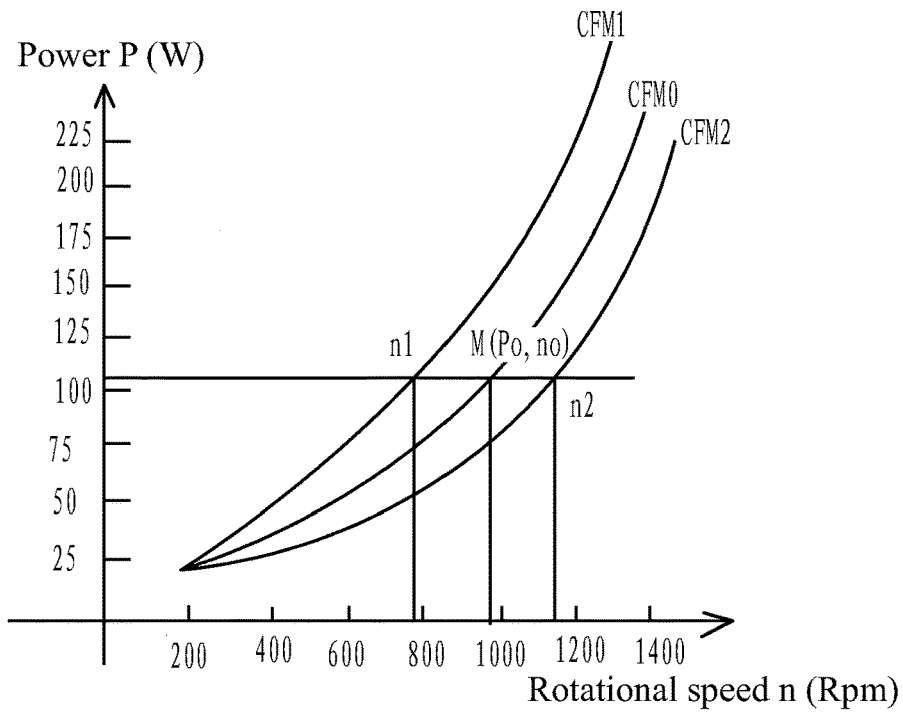
FIG. 16 is a schematic diagram showing calculation of an air volume of a motor blower in accordance with one embodiment of the invention.

According to backward reasoning of the above principle, when the motor operates in the stable state, the real-time power $P_0$ and the rotational speed $n_0$ are measured, as shown in FIG. 16, based on the point $M(P_0, n_0)$, the curve CFM$_0$ of the constant air volume control at the point $M(P_0, n_0)$ can be derived, and therefore the air volume corresponding to the point $M(P_0, n_0)$ can be known. The derivation process is as follows:

The curve CFM$_0$ is arranged between the above two known air volume curves. $P_0$ is substituted into the equations (3)-(7), the rotational speeds n(150), n(300), n(450), n(600), and n(750) corresponding to the five air volumes are obtained. By comparing the rotational speed, two known air volume curves between which the rotational speed n0 is disposed are determined. Presuming that the point $M(P_0, n_0)$ is disposed between the constant air volume curves CFM$_1$ and CFM$_2$, in condition that the input power is equal to $P_0$, the rotational speeds corresponding to the constant air volume curves CFM$_1$ and CFM$_2$ are respectively $n_1$ and $n_2$, then the constant air volume point of the point M(P$_0$, n0) is CFM$_0$=CFM$_2$+(CFM$_1$−CFM$_2$)×(n$_2$−n$_0$)÷(n$_2$−n$_1$), in which, CFM$_1$ and CFM$_2$ are two of the five air volumes 150, 300, 450, 600, and 750. It is known from the above derivation, the air volume point CFM$_0$ output by the air conditioning system can be derived based on the know real-time power $P_0$ and the rotational speed $n_0$ of the motor, and when the detected air volume is a certain degree lower than the variance of the preset air volume, it is determined that the air filter mesh is obstructed and an alarm signal is output.

EXAMPLE 2

A method for measuring an air volume of a blower motor, comprises:

a) establishing M constant air volume control functions Qi=F(n) corresponding to M air volume points CFM$_1$ in a microprocessor of a motor controller, where Q represents a DC bus current, n represents a rotational speed of the motor, and i represents an integer ranging from 1 to M;

b) starting the motor, measuring a real-time rotational speed $n_0$ and a parameter $Q_0$ of the motor after the motor runs in a stable state, putting the parameter $Q_0$ into the constant air volume control functions Qi=F(n) to obtain multiple rotational speeds $n_i$, comparing the real-time rotational speed $n_0$ with the multiple rotational speeds $n_i$ corresponding to the multiple air volume points CFM$_i$, and determining a real-time detected air volume CFM$_0$ which falls within two air volumes CFM$_i$ and CFM$_{i-1}$; and c) calculating the real-time detected air volume CFM$_0$ according to the two air volumes CFM$_i$ and CFM$_{i-1}$ and the rotational speeds $n_i$ and $n_{i-1}$ using an interpolation method.

An equation for calculating the detected air volume is CFM$_0$=CFM$_i$+(CFM$_{i-1}$−CFM$_i$)×(n$_i$−n$_0$)÷(n$_i$−n$_{i-1}$).

The functions Qi=F(n) are established as follows: for M target air volumes, allowing the motor to operate at a constant rotational speed, regulating a static pressure from a lower boundary to an upper boundary which covers an actual static pressure range in an air duct device, and then regulating the rotational speed n and the DC bus current Q of the motor to keep the target air volume, and recording the rotational speed n and the corresponding DC bus current Q at the stable state of the motor, whereby obtaining a group of the rotational speed n and the DC bus current Q for each of the M target air volumes, and establishing the function Qi=F(n) for each target air volume by curve fitting.

The blower motor operates in a control mode of a constant rotational speed. When a variance between the detected air volume and the preset air volume reaches a certain value, the alarming signal is triggered. At least five air volume points are provided, thereby ensuring the accuracy for calculation of the real-time detected air volume CFM$_0$.

EXAMPLE 3

A method for measuring an air volume of a blower motor, comprises:

a) establishing M constant air volume control functions Qi=F(n) corresponding to M air volume points $CFM_i$ in a microprocessor of a motor controller, where Q represents an output torque of the motor, n represents a rotational speed of the motor, and i represents an integer ranging from 1 to M;

b) starting the motor, measuring a real-time rotational speed $n_0$ and a parameter $Q_0$ of the motor after the motor runs in a stable state, putting the parameter $Q_0$ into the constant air volume control functions Qi=F(n) to obtain multiple rotational speeds $n_i$, comparing the real-time rotational speed $n_0$ with the multiple rotational speeds $n_i$ corresponding to the multiple air volume points $CFM_i$, and determining a real-time detected air volume $CFM_0$ which falls within two air volumes $CFM_i$ and $CFM_{i-1}$; and c) calculating the real-time detected air volume $CFM_0$ according to the two air volumes $CFM_i$ and $CFM_{i-1}$ and the rotational speeds $n_i$ and $n_{i-1}$ using an interpolation method.

An equation for calculating the detected air volume is $CFM_0=CFM_i+(CFM_{i-1}-CFM_i)\times(n_i-n_0)\div(n_i-n_{i-1})$.

The functions Qi=F(n) are established as follows: for M target air volumes, allowing the motor to operate at a constant rotational speed, regulating a static pressure from a lower boundary to an upper boundary which covers an actual static pressure range in an air duct device, and then regulating the rotational speed n and the output torque Q to keep the target air volume, and recording the rotational speed n and the corresponding output torque Q at the stable state of the motor, thereby forming a group of the rotational speed n and the output torque Q for each of the M target air volumes, and establishing the function Qi=F(n) for each target air volume by curve fitting. The output torque Q is positively proportional to the work current, thus, the output torque Q can be calculated by measuring the work current of the motor.

The blower motor operates in a control mode of a constant torque. When a variance between the detected air volume and the preset air volume reaches a certain value, the alarming signal is triggered. At least five air volume points are provided, thereby ensuring the accuracy for calculation of the real-time detected air volume $CFM_0$.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method for controlling a motor, the method comprising:

storing M constant air volume control functions $Q_i=F(n_i)$ and M air volume points $CFM_i$ in a microprocessor of a motor controller, wherein:

the motor is a blower motor and is physically connected to the motor controller;

the motor controller comprises the microprocessor and an alarm;

the M constant air volume control functions $Q_i=F(n_i)$ and the M air volume points $CFM_i$ are in one-to-one correspondence;

$Q_i$ represents an input power, a DC bus current, or a torque of the motor;

$n_i$ represents a rotational speed of the motor; and i represents an integer ranging from 1 to M;

starting the motor, activating the motor controller to measure a real-time rotational speed $n_0$ and a parameter $Q_0$ of the motor after the motor runs in a stable state and to input the parameter $Q_0$ into the microprocessor, activating the microprocessor to substitute the parameter $Q_0$ into the M constant air volume control functions $Q_i=F(n_i)$, respectively, to obtain multiple rotational speeds n activating the microprocessor to compare the real-time rotational speed $n_0$ with the multiple rotational speeds n corresponding to the M air volume points $CFM_i$ to determine two air volumes $CFM_j$ and $CFM_{j-1}$ between which a real-time air volume $CFM_0$ falls, wherein j represents an integer ranging from 1 to M;

activating the microprocessor to obtain a value of the real-time air volume $CFM_0$ via an interpolation calculation based on the two air volumes $CFM_j$ and $CFM_{j-1}$ and corresponding rotational speeds $n_j$ and $n_{j-1}$;

activating the motor controller to compare the value of the real-time air volume $CFM_0$ with a preset CFM value; and activating the motor controller to trigger the alarm when a variance between the real-time air volume $CFM_0$ and the preset CFM value reaches a preset value;

wherein:

the motor is a brushless DC (BLDC) motor or an electronically commutated motor (ECM);

the motor further comprises a motor body;

the motor body comprises: a rotating shaft, a permanent magnet rotor assembly, a stator assembly, and a housing assembly; the permanent magnet rotor assembly and the stator assembly form magnet coupling; the stator assembly comprises: a stator core and a coil winding wound thereon;

the motor controller further comprises an inverter circuit and an operation parameter detecting circuit; and an output terminal of the inverter circuit is connected to the coil winding, a detected signal is input into the microprocessor by the operation parameter detecting circuit; the inverter circuit is controlled by an output terminal of the microprocessor.

2. The method of claim 1, wherein the functions $Q_i=F(n_i)$ are established as follows: for M target air volumes, allowing the motor to operate at a constant rotational speed, regulating a static pressure from a lower boundary to an upper boundary which covers an actual static pressure range in an air duct device, and then regulating the rotational speed n and the parameter Q of the motor to keep the target air volumes, and recording the rotational speed n and the corresponding parameter Q at the stable state of the motor, whereby obtaining a group of rotational speeds n and parameters Q for each of the M target air volumes, and establishing the function $Q_i=F(n_i)$ for each target air volume by curve fitting.

3. The method of claim 1, wherein the M air volume points $CFM_i$, comprise a maximum output air volume and a minimum output air volume.

4. The method of claim 1, wherein $Q_i=F(n_i)$ is a second order function, and each target air volume corresponds to the function $Q=C_1+C_2\times n+C_3\times n^2$, where $C_1$, $C_2$ and $C_3$ represent coefficients, n represents the rotational speed of the motor.

5. The method of claim 1, wherein the motor operates in a control mode of a constant air volume.

6. The method of claim 1, wherein the motor operates in a control mode of a constant torque.

7. The method of claim 1, wherein the motor operates in a control mode of a constant rotational speed.

8. The method of claim 1, wherein at least five air volume points are appointed.

9. A method for controlling a motor, the method comprising:
- storing M constant air volume control functions $Q_i=F(n_i)$ and M air volume points $CFM_i$ in a microprocessor of a motor controller, wherein:
  - the motor is a blower motor and is physically connected to the motor controller;
  - the motor controller comprises the microprocessor and an alarm;
  - the M constant air volume control functions $Q_i=F(n_i)$ and the M air volume points $CFM_i$ are in one-to-one correspondence;
  - $Q_i$ represents an input power, a DC bus current, or a torque of the motor;
  - $n_i$ represents a rotational speed of the motor; and
  - i represents an integer ranging from 1 to M;
- starting the motor, activating the motor controller to measure a real-time rotational speed $n_0$ and a parameter $Q_0$ of the motor after the motor runs in a stable state and to input the parameter $Q_0$ into the microprocessor, activating the microprocessor to substitute the parameter $Q_0$ into the M constant air volume control functions $Q_i=F(n_i)$, respectively, to obtain multiple rotational speeds n activating the microprocessor to compare the real-time rotational speed $n_0$ with the multiple rotational speeds n corresponding to the M air volume points $CFM_i$ to determine two air volumes $CFM_j$ and $CFM_{j-1}$ between which a real-time air volume $CFM_0$ falls, wherein j represents an integer ranging from 1 to M;
- activating the microprocessor to obtain a value of the real-time air volume $CFM_0$ via an interpolation calculation based on the two air volumes $CFM_j$ and $CFM_{j-1}$ and corresponding rotational speeds $n_j$ and $n_{j-1}$;
- activating the motor controller to compare the value of the real-time air volume $CFM_0$ with a preset CFM value; and
- activating the motor controller to trigger the alarm when a variance between the real-time air volume $CFM_0$ and the preset CFM value reaches a preset value;

wherein:
- an equation for calculating the real-time air volume is $CFM_0=CFM_j+(CFM_{j-1}-CFM_j)\times(n_j-n_0)\div(n_j-n_{j-1})$;
- the motor is a BLDC motor or an ECM motor;
- the motor further comprises a motor body;
- the motor body comprises: a rotating shaft, a permanent magnet rotor assembly, a stator assembly, and a housing assembly; the permanent magnet rotor assembly and the stator assembly form magnet coupling; the stator assembly comprises: a stator core and a coil winding wound thereon;
- the motor controller further comprises an inverter and an operation parameter detecting circuit; and
- an output terminal of the inverter circuit is connected to the coil winding, a detected signal is input into the microprocessor by the operation parameter detecting circuit; the inverter circuit is controlled by an output terminal of the microprocessor.

10. The method of claim 9, wherein the functions $Q_i=F(n_i)$ are established as follows: for M target air volumes, allowing the motor to operate at a constant rotational speed, regulating a static pressure from a lower boundary to an upper boundary which covers an actual static pressure range in an air duct device, and then regulating the rotational speed n and the parameter Q of the motor to keep the target air volume, and recording the rotational speed n and the corresponding parameter Q at the stable state of the motor, whereby obtaining a group of rotational speeds n and parameters Q for each of the M target air volumes, and establishing the function $Q_i=F(n_i)$ for each target air volume by curve fitting.

11. The method of claim 9, wherein the M air volume points $CFM_i$, comprise a maximum output air volume and a minimum output air volume.

12. The method of claim 9, wherein $Q_i=F(n_i)$ is a second order function, and each target air volume corresponds to the function $Q=C_1+C_2\times n+C_3\times n^2$, where $C_1, C_2$ and $C_3$ represent coefficients, n represents the rotational speed of the motor.

13. The method of claim 9, wherein the motor operates in a control mode of a constant air volume.

14. The method of claim 9, wherein the motor operates in a control mode of a constant torque.

15. The method of claim 9, wherein the motor operates in a control mode of a constant rotational speed.

16. The method of claim 9, wherein at least five air volume points are appointed.

* * * * *